United States Patent
Hu et al.

(10) Patent No.: US 9,002,195 B2
(45) Date of Patent: Apr. 7, 2015

(54) SOLUTION FOR HITLESS PROTECTION IN HIGH-SPEED OTN FRAMER AND FRONT-END

(71) Applicant: NEC Laboratories America, Inc., Princeton, NJ (US)

(72) Inventors: Junqiang Hu, Davis, CA (US); Philip Nan Ji, Plainsboro, NJ (US); Ting Wang, West Windsor, NJ (US); Yoshiaki Aono, Tokyo (JP)

(73) Assignee: NEC Laboratories America, Inc., Princeton, NJ (US)

( * ) Notice: Subject to any disclaimer, the term of this patent is extended or adjusted under 35 U.S.C. 154(b) by 270 days.

(21) Appl. No.: 13/628,572

(22) Filed: Sep. 27, 2012

(65) Prior Publication Data

US 2013/0170825 A1    Jul. 4, 2013

Related U.S. Application Data

(60) Provisional application No. 61/540,608, filed on Sep. 29, 2011.

(51) Int. Cl.
*H04B 10/00* (2013.01)
*H04B 10/038* (2013.01)
*H04B 10/032* (2013.01)

(52) U.S. Cl.
CPC ............ *H04B 10/038* (2013.01); *H04B 10/032* (2013.01)

(58) Field of Classification Search
CPC ..... H04B 10/038; H04B 10/032; H04J 3/062; H04J 3/14; H04J 14/0241; H04J 14/0283; H04J 14/0227
See application file for complete search history.

(56) References Cited

U.S. PATENT DOCUMENTS

| | | | |
|---|---|---|---|
| 6,031,838 A * | 2/2000 | Okabe et al. ............... 370/395.6 |
| 2002/0176356 A1* | 11/2002 | Courtney et al. ............. 370/216 |
| 2003/0185330 A1* | 10/2003 | Hessel et al. .................. 375/376 |
| 2004/0181350 A1* | 9/2004 | Fernando ........................ 702/67 |
| 2008/0079510 A1* | 4/2008 | Seethamraju et al. ........ 331/179 |
| 2008/0267078 A1* | 10/2008 | Farinacci et al. ............. 370/244 |

* cited by examiner

*Primary Examiner* — Ken Vanderpuye
*Assistant Examiner* — David Lambert
(74) *Attorney, Agent, or Firm* — Joseph Kolodka

(57) ABSTRACT

In an optical communication system containing a primary line and backup line card, a method includes providing interfaces for the primary and backup line card, each line card including a transmitter and receiver; and selecting output from the transmitter from either the primary or back up line card including selecting the backup line card when the primary line card encounters a failure.

14 Claims, 4 Drawing Sheets

nized.
SOLUTION FOR HITLESS PROTECTION IN HIGH-SPEED OTN FRAMER AND FRONT-END

RELATED APPLICATION INFORMATION

This application claims priority to provisional application No. 61/540,608 filed Sep. 29, 2011, the contents thereof are incorporated herein by reference.

BACKGROUND OF THE INVENTION

The present invention relates generally to optical communications, and more particularly, to a method for hitless protection in high optical transport network OTN framer and front end.

The Ensuring no traffic loss becomes more and more important in today's telecommunication systems. Internet trading is one of the applications that require packet loss to be as low as possible; real-time Internet applications such as voice over IP and video conferences are coming to people's daily life, and packet loss is undesirable for the causing of flickering noises on the phone lines or viewing distorted video clips. Service continuity is more critical comparing to traffic loss, so redundancy protection are always built into the telecommunications systems to avoid service interruption during system or link failure. Redundancy protection is the technique to provide a backup line card or fabric card and replace the primary one when failure occurs. Shown in FIG. 1 is a block diagram of an exemplary communication system 100 with line card protection, where primary line card 102 and backup line card 104 are connected to the same physical link 110 through switch 106, which is further controlled by protection control signal 108. In normal mode, switch 106 selects the output from primary line card 102, while in case failure happens in 102, the backup line card 104 will be connected to the output link 110. For the above application reasons, it is important to minimize traffic loss when switching from primary to the backup one.

Hitless protection describes the ability of switching to protecting mode without losing frame and framing synchronization when failure occurs, to ensure that telecommunications equipment provide uninterrupted or continuous service and maintain an extremely high-reliability rating. This requires bit-level aligned between primary and backup interfaces, to keep receiver side synchronized when switching from primary to backup one. Shown in FIG. 2 is a block diagram of an exemplary configuration in system 100 to support bit alignment, where tunable delay lines 112 and alignment detection circuit 114 is added for bit alignment purpose. Tunable delay lines 112 can also be integrated inside the line cards, either before or after the optical modulator. Alignment detection function 114 can either be integrated with the system, or through external method. In low-speed case, this is easier to achieve because the symbol period is wide enough to allow relatively large skew between primary and backup interface. However in high-speed case, for example 100 Gb/s line rate with QPSK modulation and polarization mode multiplexing, the serial data rate is around 25 Gb/s, which is equivalent to 40 picoseconds per symbol. It is very difficult or time consuming to align the output signals for such short bit period.

In an optical system, the switching from primary interface to the backup one may be achieved by shutting down the light from primary line card and enabling the output from backup line card, or using an optical switch. Overlapping of two optical signals may cause corrupted signals in receiver side due to beating noise, and the switching from one to another may encounter certain delay that causes signal loss. So in any case the receiver side may experience signal loss during the switching time. This signal loss will cause receiver side loss synchronization, and it will take long time to get re-synchronized.

To describe the actual effect for the above mentioned problem, here we give an example using an optical transport network (OTN). OTN uses frame alignment signal (FAS) for frame aligning. The OTN frame is of fixed size (say size L), and FAS field is located at the beginning of each frame. In an example OTN receiver, after system reset, it searches for FAS within the incoming data stream. After first FAS match, the internal data and phase alignment is adjusted to the newly found FAS. The receiver keeps on checking the FAS pattern for certain period, and in case all the checking matches, it will reach in-frame state. In this state it keeps on monitoring the FAS pattern for each frame, and if there is mismatch for a pre-configured number of frames, it will switch into out-of-frame state which means loss of frame synchronization. When switching from primary line card to the backup one, bit misalignment will cause bit(s) missing or duplication. Either case will cause continuous FAS checking failure and finally enter out-of-frame state which makes the system fail to support hitless protection. Signal loss will lead to the same result as bit misalignment.

Accordingly, there is a need for provides a solution to eliminate the constraint of exact bit and phase alignment, and to quickly recover in case of signal loss, by modifying the operating procedure in receiver side.

BRIEF SUMMARY OF THE INVENTION

The present invention is directed a method in an optical communication system containing a primary line and backup line card. The method includes providing interfaces for the primary and backup line card, each line card including a transmitter and receiver; and selecting output from the transmitter from either the primary or back up line card including selecting the backup line card when the primary line card encounters a failure. The interfaces are synchronous, frame based and include a start sequence for each frame. The receiver has primary and other frame start detecting modules to work in parallel when the receiver enters a normal working mode. The receiver switches to a point of a frame start detected by another module if the primary start detecting module encounters a frame start loss.

These and other advantages of the invention will be apparent to those of ordinary skill in the art by reference to the following detailed description and the accompanying drawings.

DETAILED DESCRIPTION

The present invention is directed to a method that uses multiple FAS detecting modules to work in parallel, and when it encounters frame loss, it temporally uses the one detected sync to decode the frame. When initially started, one FAS detecting module is used as master and the whole operation is same as in prior art, until it reaches sync state; then all the other sync modules check the synchronization status by shifting one bit each, including backward and forward. In the sync state, if the master FAS detecting module encounters frame loss, while another module (say module s1) detects the FAS, then it switches to a "pseudo-sync" state, in which it uses the starting point detected by s1 and waits for more frames to check whether more still synchronized to s1. If after a pre-defined threshold it is still synchronized to s1, then s1 will be set as the master module and the other modules will detect a different starting point again.

Figure 3:
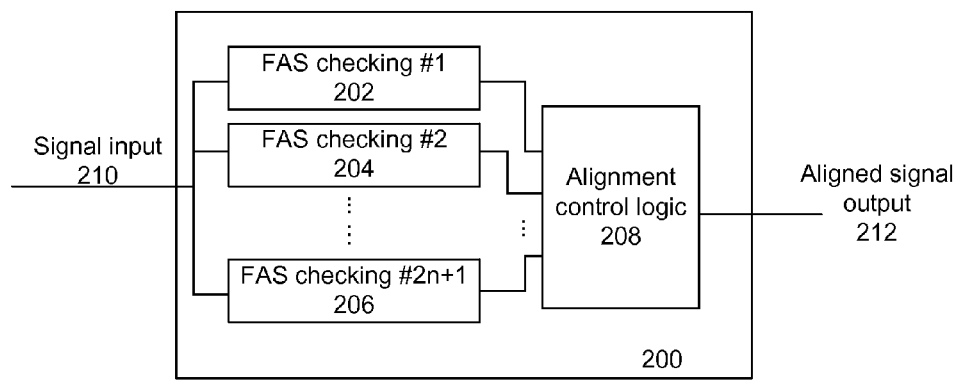
FIG. 3 is a block diagram showing a multiple FAS detecting module inside frame synchronization and an alignment module, in accordance with the invention.

More specifically, the present invention modifies the receiver internal state machine, to eliminate the constraint of accurate time alignment (both bit and phase). Instead of having a single FAS checking element, the modified receiver can have multiple instances to work in parallel, with one instance as primary and the outputs from others only considered when the primary one encounters FAS loss. Referring to the block diagram of FIG. 3, a frame alignment unit 200 takes signal input 210 and generates frame-aligned output signal 212. Inside 200, there are 2n+1 (n=1, 2, . . . ) FAS checking modules, like module 202, 204, and 206, which are controlled by alignment control logic 208. Same as prior art (see section A1), initially one FAS checking module (e.g., module 202) works as primary one, to have frame alignment unit 200 enter sync state. Then using FAS starting point detected by the primary element as reference, each of the other FAS checking element checks for different offset with one bit difference between each. For example, logically naming all these checking elements from $E_{-n}$ to $E_n$ ("n" gives the maximum tolerance of bit skew), and $E_0$ represents the primary element that detects the signals starting from time $t_0+L_F*t_b$, where $L_F$ is the number of bits in each frame and $t_b$ is the period of a single bit, then $E_i$ ($i \in [-n, n]$) will check for FAS from time $t_0+(L_F+i)*t_b$. The detection from different delay point is controlled by alignment control logic 208, after reference from primary FAS checking element is decided. Alignment control logic 208 also implements the state machine for frame aligning status control, which includes the initial procedure to enter sync state.

Figure 4:
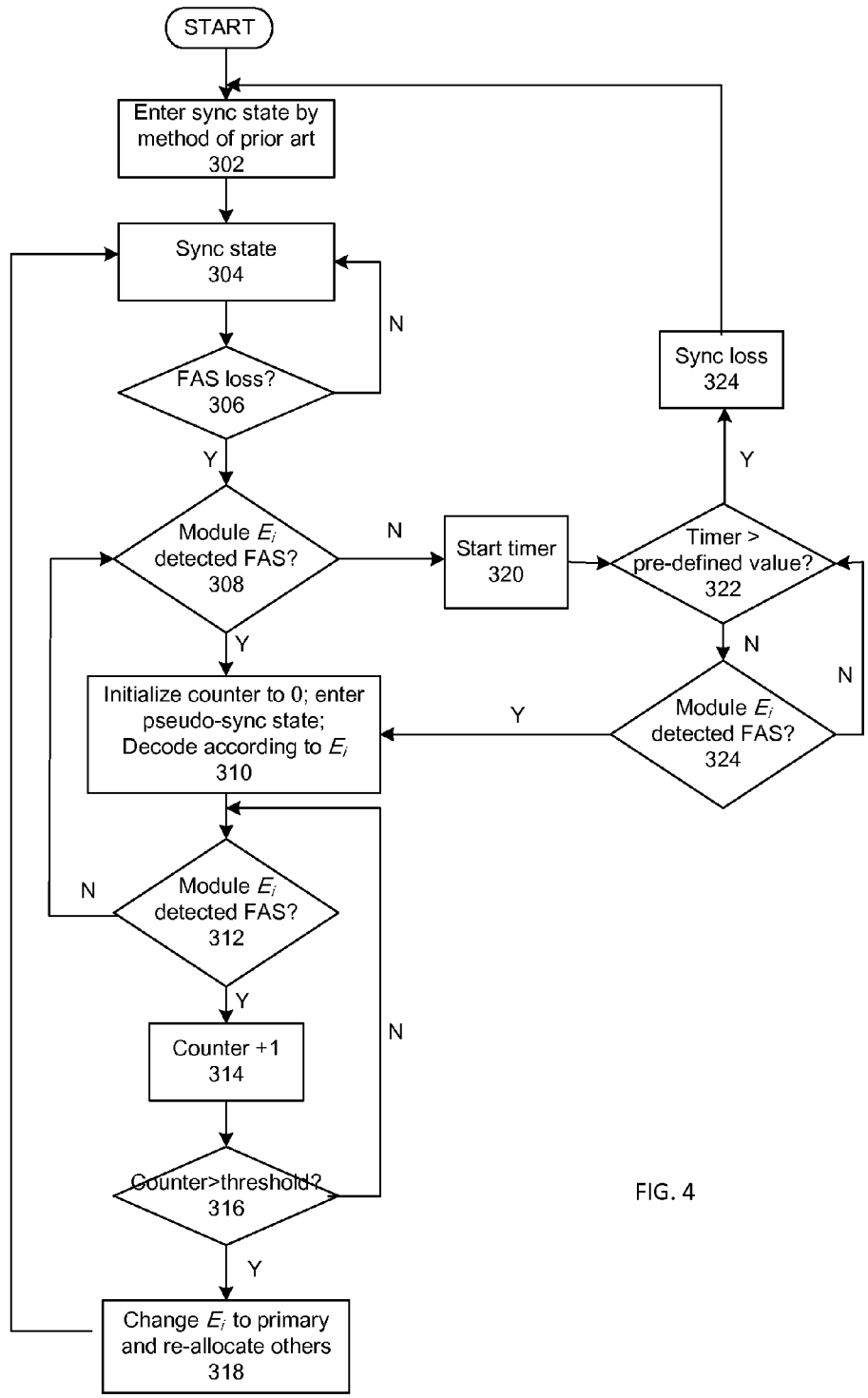
FIG. 4 is a flow chart for modified receiver frame alignment state machine, in accordance with the invention.

With added FAS checking modules, the present invention modifies the state machine inside 208, as shown in the flow chart of FIG. 4. Initially, the state machine using the method of prior art 302 to enter sync state 304. Inside sync state, it keeps on monitoring the status from primary FAS checking module $E_0$. If FAS loss (step 306), it checks whether any other FAS detecting module $E_i$ found FAS (step 308). If certain $E_i$ found, it enters pseudo-sync state, initializes counter to 0, and decodes according to $E_i$ (step 310). Then in pseudo-sync state, it keeps on monitoring result from Ei (step 312), if it is locked, then increment counter by 1 (step 314), otherwise it checks for whether any other Ei detects FAS. If the counter exceeds the pre-defined threshold (step 316), then change Ei as primary detector and re-allocate the others for different bit offset checking (step 318). In step 308, if no FAS detected by any module, then start timer (step 320). If timer is larger than pre-defined value (322), the system is in sync loss state (324) and will try to re-synchronize; otherwise check whether any module detected FAS (step 324).

Note that before switching from step 316 to 318, if the primary module $E_0$ detects FAS again, the state machine may still keep $E_0$ as primary one and return to sync state. When no module detects FAS, the alignment module may still assume the input is locked to reference point given by $E_0$ and keep on aligning the frame.

With this modified state machine, in transmitter side, the constraint of bit alignment can be eliminated, and only phase alignment is needed, given that the maximum bit skew between the two line cards does not exceed n (where 2n+1 is the total number of FAS detecting elements). This can simplify the aligning method. For example, in the case of FIG. 2, if an external oscilloscope is used to check for the alignment, by prior art, a known sequence and its corresponding trigger signal are needed; when only phase alignment is necessary, any pattern can be used and the trigger can be clock-type which is more common.

Figure 1:
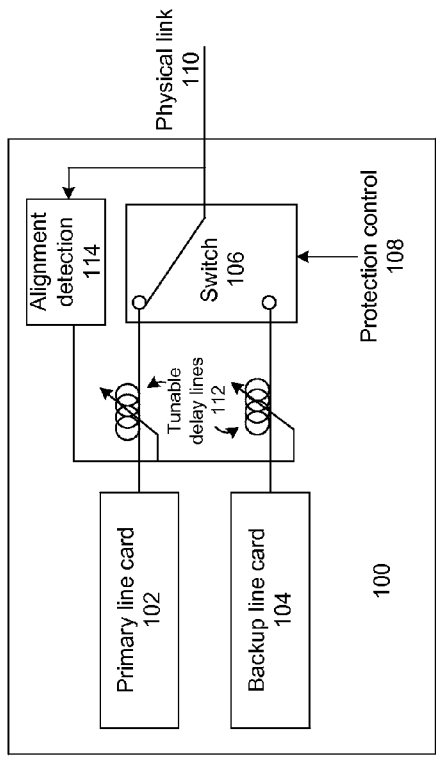
FIG. 1 is a block diagram illustrating a line card with protection.
Figure 2:
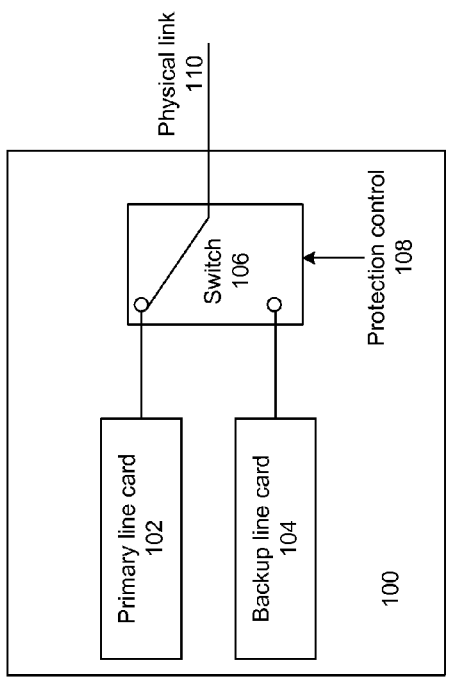
FIG. 2 is a block diagram illustrating line card protection using a tunable delay line.
Figure 5:
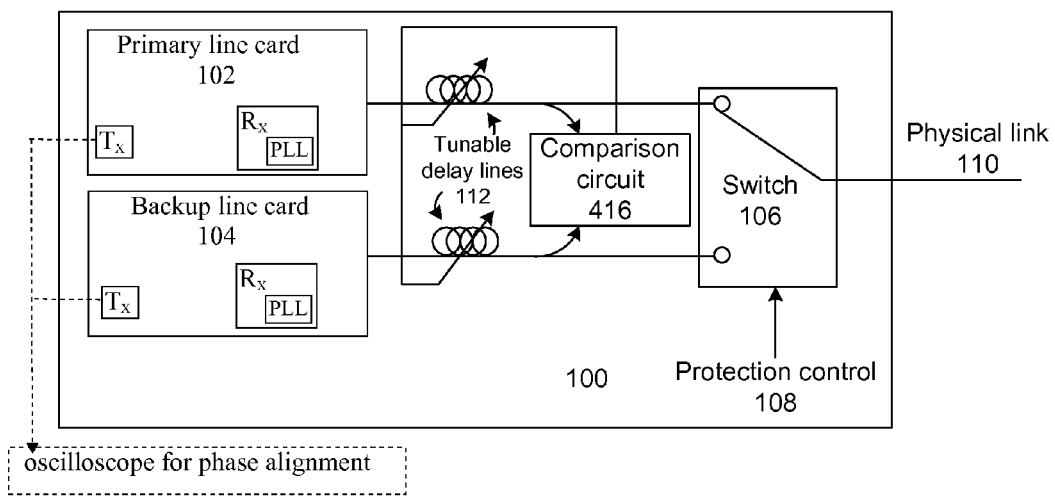
FIG. 5 is a block diagram of a a physical link tuning method for bit alignment, in accordance with the invention.

The alignment detection module 114, shown in FIG. 2, can also be connected to the outputs of both the primary and backup line cards. As shown in FIG. 5, comparison circuit 416 takes input from the two line cards output after the tunable delay lines. When only phase alignment is needed, comparison circuit 416 can be a data phase comparator, to check whether the two line cards' outputs are aligned. This solution aligns signals at the point of comparison input, so pre-alignment is necessary from that point to the output optical link, or pre-known skew is needed and should be considered when tuning the delay line.

In most cases because of the transmitter side primary-to-backup switching time, the receiver will encounter one or more frames loss. If the receiver PLL can be locked within short period (e.g., several symbols time), by the proposed approach, the transmitter side phase alignment is even not necessary. For a transmitter with longer restoration time, the receiver PLL may lose locked state, and it may take longer time to recover. For such system, one solution is to keep the PLL in pseudo locked state, for example, if encounters loss-of-signal, the phase error may be set to zero, which in turn leaves frequency offset as constant value. This may help the PLL to re-lock faster, within several symbols. Under these conditions, the only constraint to the transmitter side is to have the bit skew limited within the maximum tolerance range (n-bit where 2n+1 is the total number of FAS checking elements). Same principle can be applied when primary and backup line cards are not phase aligned and one or two frames loss is acceptable. In such case, the tunable delay line may be eliminated from transmitter side.

Figure 6:
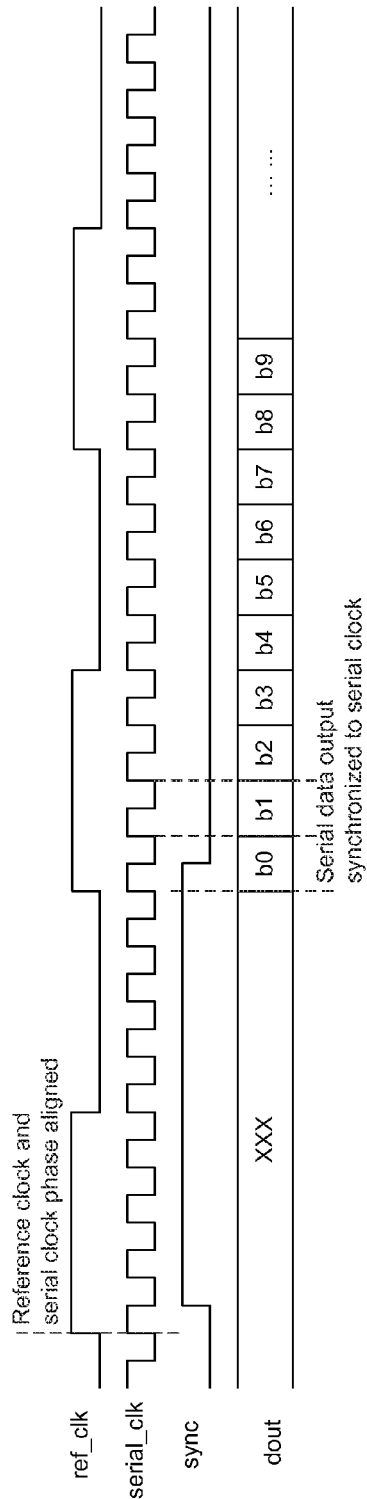
FIG. 6 is illustrates phase relationship and synchronization among serial input data, serial clock, and reference clock.

As mentioned above, the maximum bit skew that the system can tolerant is n, where 2n+1 is the total number of FAS checking modules. So minimizing the bit skew between the primary and backup line cards can help to reduce the needed FAS checking modules. For this purpose, a synchronization control signal is needed for the framers to initiate the frame transmission. This signal can be generated from a central point (for example, the switch fabric card) to all the line cards, or from the primary line card to the backup line card. It must be synchronized with a reference clock signal which is used to generate the serial transmission clock by a PLL inside the framer. Usually a framer device (or a serializer module) takes a reference clock as input and uses internal PLL to generate the high-frequency clock for serial output data. The high-frequency clock is phase-aligned with reference clock, and the serial output data is synchronized to the high-frequency clock (as shown in FIG. 6), where ref_clk is reference clock input, serial_clk is high-frequency clock for serial transmission, dout is serial data output, and sync is the synchronization control signal). Considering the dout skew from its generating clock (i.e., the high-frequency clock) is small, the dout skew between primary and backup line card will be small, in case their reference clocks are phase aligned at the point inputting to PLL, and the sync signals are aligned to the same ref_clk cycle. In practical design, this can be achieved by having ref_clk and sync signals generated from the same board and distributed to the primary and backup line cards using equal length traces.

Figure 7:
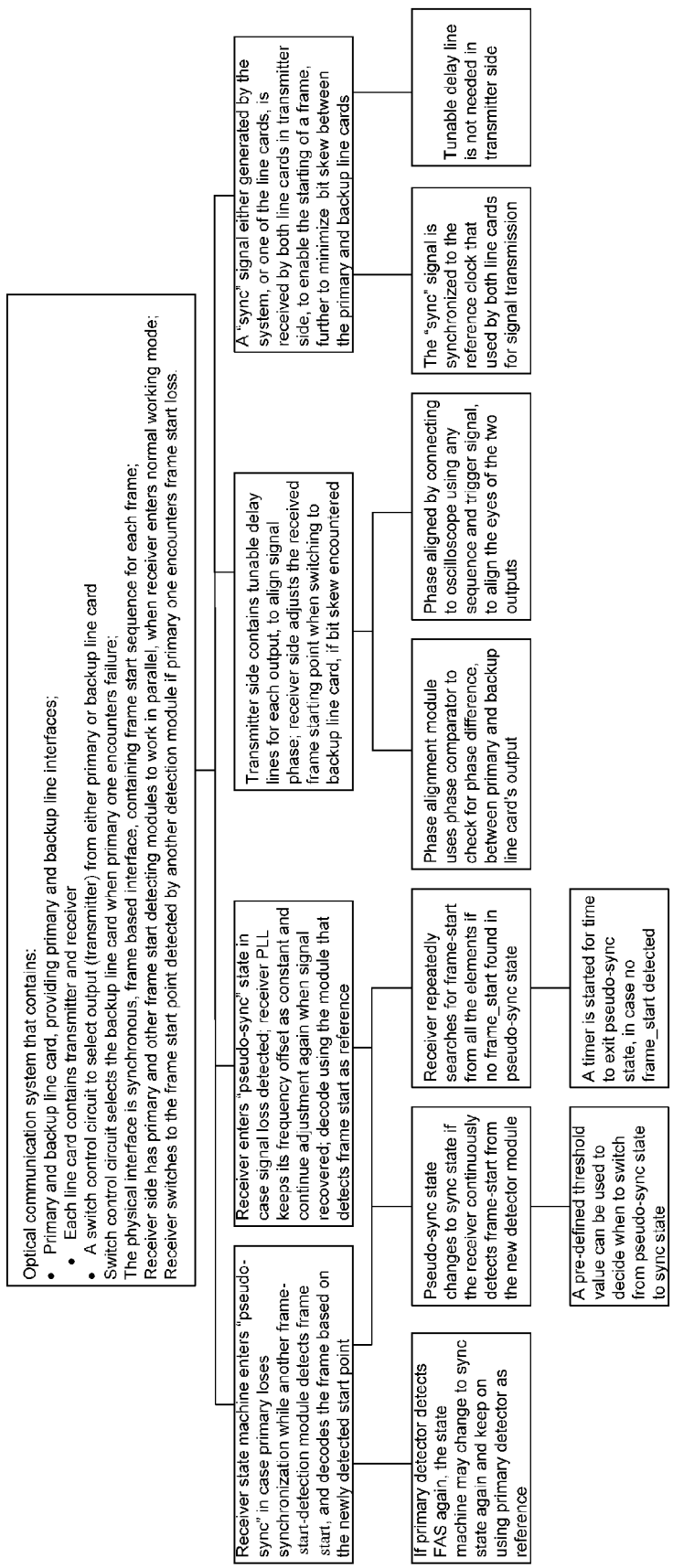
FIG. 7 is a diagram of key aspects of the inventive method.

Referring now to the diagram of FIG. 7, key aspects of the invention are shown. In an optical communication system containing a primary line and backup line card with respective primary and backup line interfaces. Each line card includes a transmitter and receiver. A control is used to select output from the transmitter from either the primary or back up line card. The control selects the backup line card when the primary line card encounters a failure. The physical interface is synchronous, frame based and contains a frame start sequence for each frame. The receiver side has primary and other frame start detecting modules to work in parallel when the receiver enters a normal working mode. The receiver switches to the frame start point detected by another module if the primary start detecting module encounters a frame start loss.

The receiver state machine enters a "pseudo-sync" state when the primary start detecting module loses synchronization while another frame-start detection module detects a new frame start and decodes the frame based on the newly detected frame start point. If the primary start detecting module detects a frame alignment signal FAS again, the receiver state machine may change to a sync state again and use the primary detector as reference.

The receiver enters a pseudo-sync state when a signal loss is detected and the receiver phase lock loop PLL keeps its frequency offset constant and continues adjustment again when the signal is recovered. The receiver decodes the recovered signal using the module that detects a frame start as a reference. The pseudo-sync state changes to the sync state if the receiver continuously detects the frame start from a new detector module. A predefined threshold value can be used to decide when to switch from the pseudo-sync state to the sync state. The receiver repeatedly searches for the frame start from all elements if no frame start is found in the pseudo-sync state. A timer is started for a time to exit the pseudo-sync state responsive to no frame start being detected.

The transmitter side contains tunable delay lines for each output from the transmitter for aligning a signal phase. The receiver adjusts the received frame starting point when switching to the backup line card if bit skew is encountered. The phase alignment module uses a phase comparator to check phase difference between primary and backup line card's output. The phase can be aligned by connecting to an oscilloscope using any sequence and trigger signal to align eyes of two outputs.

A sync signal generated by either the optical communication system or one of the primary and backup line cards is received by both the primary and backup line cards in the transmitter side to enable the starting of a frame and further minimize bet skew between the primary and backup line cards. The sync signal is synchronized to a reference clock used by the primary and backup line cards for signal transmission. A tunable delay line is not needed on the transmitter side.

From the foregoing, it can be appreciated that the present invention allows bit-shifting between the signals outputted from primary and backup line cards. This will simplify the alignment method to align the signals phase only, so that a phase detector may be used to automatically adjust the output delay from primary and backup line cards. In addition, when the receiver encounters signal loss, the recovery time will be much shorter compared to the prior art, so frame loss will be reduced.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. In an optical communication system containing a primary line card and backup line card, a method comprising the steps of:
    providing interfaces for said primary line card and backup line card, each line card including a transmitter and receiver; and
    selecting output from said transmitter from either said primary or back up line card including selecting said backup line card when said primary line card encounters a failure;
    using a frame alignment signal (FAS) for frame aligning by using a FAS starting point detected by the primary line card as a reference and using a plurality of FAS checking elements each detecting different offset with one bit difference between each; and
    logically naming checking elements $E_{-n}$ to $E_n$, n being a bit skew tolerance, and $E_0$ represents a primary element that detects signals starting from time $t_0+L_{F*tb}$, where $L_F$ is a number of bits in each frame and $t_b$ is the period of a single bit, $E_i(i \in [-n,n])$ checks for the FAS from time $t_0+(L_F+i)*t_b$;
    wherein said interfaces are synchronous, frame based and comprise a start sequence for each frame, said receiver having a primary frame start detecting module and other frame start detecting modules to work in parallel when said receiver enters a normal working mode, said receiver switching to a point of a frame start detected by another module if said primary start detecting module encounters a frame start loss.

2. The method of claim 1, wherein a receiver state enters a pseudo-sync state responsive to said primary start detecting module losing synchronization while another frame-start detection module detects a new frame start and decodes the frame based on a newly detected frame start point.

3. The method of claim 2, wherein if said primary start detecting module detects a frame alignment signal FAS again, said receiver state may change to a sync state again and use a primary detector as reference.

4. The method of claim 2, wherein when a receiver enters a pseudo-sync state responsive to a detected signal loss, a receiver phase lock loop PLL keeps its frequency offset constant and continues adjustment again when said signal is recovered and decoding is done using a module that detects a frame start as a reference.

5. The method of claim 4, wherein said pseudo-sync state changes to said sync state if one of said receivers continuously detects a frame start from a new detector module.

6. The method of claim 5, wherein a predefined threshold value is used to decide when to switch from said pseudo-sync state to said sync state.

7. The method of claim 4, wherein one of said receivers repeatedly searches for said frame start from all elements if no frame start is found in said pseudo-sync state.

8. The method of claim 7, wherein a timer is started for a time to exit said pseudo-sync state responsive to no frame start detection.

9. The method of claim 1, wherein a transmitter side contains tunable delay lines for each output from said transmitter for aligning a signal phase, said receiver adjusting a received frame starting point when switching to said backup line card if bit skew is encountered.

10. The method of claim 9, wherein a phase alignment module uses a phase comparator to check phase difference between outputs from said primary and backup line cards.

11. The method of claim 9, wherein a phase is aligned by connecting to an oscilloscope using any sequence and trigger signal to align eyes of two outputs.

12. The method of claim 1, wherein a sync signal is generated by said optical communication system or one of the primary and backup line cards, said sync signal being received by both said primary and back line cards in one of said transmitters for enabling starting of a frame and further minimizing bit skew between said primary and backup line cards.

13. The method of claim 12, wherein said sync signal is synchronized to a reference clock used by said primary and backup line cards for signal transmission.

14. The method of claim 12, wherein one of said transmitters is without a tunable delay line.

* * * * *